(12) United States Patent
Warren et al.

(10) Patent No.: US 9,645,988 B1
(45) Date of Patent: May 9, 2017

(54) SYSTEM AND METHOD FOR IDENTIFYING PASSAGES IN ELECTRONIC DOCUMENTS

(71) Applicant: Kira Inc., Toronto (CA)

(72) Inventors: Robert Henry Warren, Toronto, CA (US); Alexander Karl Hudek, Toronto, CA (US)

(73) Assignee: KIRA INC., Toronto (CA)

( * ) Notice: Subject to any disclaimer, the term of this patent is extended or adjusted under 35 U.S.C. 154(b) by 0 days.

(21) Appl. No.: 15/246,659

(22) Filed: Aug. 25, 2016

(51) Int. Cl.
*G06F 7/00* (2006.01)
*G06F 17/24* (2006.01)
*G06F 17/27* (2006.01)
*G06F 17/30* (2006.01)

(52) U.S. Cl.
CPC ........ *G06F 17/241* (2013.01); *G06F 17/2705* (2013.01); *G06F 17/277* (2013.01); *G06F 17/30684* (2013.01)

(58) Field of Classification Search
CPC .. G06F 17/241; G06F 17/2705; G06F 17/277; G06F 17/30684; G06F 17/30525; G06F 17/30882
USPC .................. 707/728, 730, 737, 738, 999.006
See application file for complete search history.

(56) References Cited

U.S. PATENT DOCUMENTS

| | | | | |
|---|---|---|---|---|
| 6,154,213 A * | 11/2000 | Rennison | .......... | G06F 17/30716 345/428 |
| 7,496,571 B2 * | 2/2009 | Benedikt | ............. | G06F 17/2247 |
| 9,183,274 B1 * | 11/2015 | Zhang | ................. | G06F 17/2785 |
| 2002/0042711 A1 * | 4/2002 | Lin | ...................... | G10L 15/1822 704/257 |
| 2003/0018470 A1 * | 1/2003 | Golden | ................... | G06F 17/27 704/10 |
| 2003/0233232 A1 * | 12/2003 | Fosler-Lussier | .... | G10L 15/1815 704/251 |
| 2004/0186705 A1 * | 9/2004 | Morgan | ................ | G06F 17/241 704/9 |
| 2005/0149510 A1 * | 7/2005 | Shafrir | .............. | G06F 17/30734 |

(Continued)

OTHER PUBLICATIONS

Conditional Random Fields: Probabilistic Models for Segmenting and Labeling Sequence Data, John Lafferty, Andrew McCallum, Fernando C.N. Pereira, University of Pennsylvania, Department of Computer & Information Science, 8-28, 2001.*

(Continued)

*Primary Examiner* — Mohammed R Uddin
(74) *Attorney, Agent, or Firm* — Elan IP Inc.

(57) ABSTRACT

The methods proposed here deconstructs training sentences into a stream of features that represent both the sentences and tokens used by the text, their sequence and other ancillary features extracted using natural language processing. Then, we use a conditional random field where we represent the concept we are looking for as state A and the background (everything not concept A) as a state B. The model created by this training phase is then used to locate the concept as a sequence of sentences within a document. This has distinct advantages in accuracy and speed over methods that individually classify each sentence and then use a secondary method to group the classified sentences into passages. Furthermore while previous methods were based on searching for the occurrence of tokens only, the use of a wider set of features enables this method to locate relevant passages even though a different terminology is in use.

12 Claims, 4 Drawing Sheets

(56) References Cited

U.S. PATENT DOCUMENTS

| | | | | |
|---|---|---|---|---|
| 2007/0022373 | A1* | 1/2007 | Chidlovskii | G06F 17/241 |
| | | | | 715/210 |
| 2009/0083200 | A1* | 3/2009 | Pollara | G06N 99/005 |
| | | | | 706/14 |
| 2011/0093449 | A1* | 4/2011 | Belenzon | G06N 7/005 |
| | | | | 707/708 |
| 2011/0258188 | A1* | 10/2011 | AbdAlmageed | G06F 17/30796 |
| | | | | 707/736 |
| 2011/0320396 | A1* | 12/2011 | Hunt | G06N 5/02 |
| | | | | 706/47 |
| 2012/0200567 | A1* | 8/2012 | Mandel | G06F 17/30994 |
| | | | | 345/420 |
| 2013/0204876 | A1* | 8/2013 | Szucs | G06F 17/30737 |
| | | | | 707/738 |
| 2014/0040275 | A1* | 2/2014 | Dang | G06F 17/2785 |
| | | | | 707/741 |
| 2014/0101527 | A1* | 4/2014 | Suciu | G06F 17/218 |
| | | | | 715/230 |
| 2014/0324808 | A1* | 10/2014 | Sandhu | G06F 17/2785 |
| | | | | 707/706 |
| 2016/0110428 | A1* | 4/2016 | Vasenkov | G06F 17/30734 |
| | | | | 707/776 |

OTHER PUBLICATIONS

Hirohata, K., Okazaki, N., Ananiadou, S. and Ishizuka, M. (1990): Identifying Sections in Scientific Abstracts using Conditional Random Fields. Proc. of the Third International Joint Conference on NLP, 381-388.

* cited by examiner

S1: "Patents" means the items listed in Schedule A and any divisionals, continuations and foreign equivalents.

S2: The patents and trademarks are all owned by ABC Corporation.

S3: The contract is governed by the laws of Ohio.

S4: The core product is described in US 13/999,999.

S5: Intellectual Corporation Inc. leases the property at End of Road Avenue.

RESULTS

"Patents" means the items listed in Schedule A and any divisionals, continuations and foreign equivalents.
The patents and trademarks are all owned by ABC Corporation.

The core product is described in US 13/999,999.

FIG. 3

SYSTEM AND METHOD FOR IDENTIFYING PASSAGES IN ELECTRONIC DOCUMENTS

TECHNICAL FIELD

The invention relates generally to text passage locating and retrieval in electronic documents, and more specifically to a method and system for relevant identifying passages in electronic document using conditional random fields.

BACKGROUND

Electronic documents or passages of text otherwise stored electronically (such as stored directly on web pages accessible via the internet) can contain large amounts of information either in a single source or over multiple sources. With regards to electronic documents this is particularly relevant to the review of vast amounts of electronic documents, be it those originally in electronic form or those which have been converted into electronic documents, where particular types of passages or groups of text have to be identified. For example, it could be necessary to search through a document or number of documents to identify passages related to specific contract language in a legal due diligence exercise.

Prior art solutions range from simple word searches in text to slightly more sophisticated methods capable searching text based on the characteristics of the tokens or the text, or the tokens contained within the text of headers. One such example is shown in the paper entitled "Identifying Sections in Scientific Abstracts Using Conditional Random Fields" by Hirohata et al. (2008). In this paper, conditional random fields are used to pull out specific text following the use of conditional random fields to determine section headings in the abstracts of scientific papers. For example, one could use the Hirohata method to extract all the Conclusions from a group of scientific papers in order to quickly review the conclusions drawn from a plurality of papers without having to manually search through the text of all papers.

However, the Hirohata method is heavily dependent on the proper labelling of sections within abstracts and specifically requires that a heading named "Conclusion" be present in order to pull out the sentence or sentences following this heading. Applications of the teachings of Hirohata more broadly would still require searching to be based on a particular pre-defined token or feature of text.

There is accordingly a need in the art for an improved method and system capable of identifying passages in electronic documents.

SUMMARY OF THE INVENTION

In one embodiment of the invention, there is disclosed A method for searching an electronic document for passages relating to a concept being searched for, where the concept is expressed as a word or plurality of words, the method including deconstructing by a computer processor training electronic texts stored on a computer readable into a stream of features; storing the stream of features in a data store; wherein the features include the text of sentences, tokens used by the text in each sentence, anciliary non-token features of the texts, word vectors, sequences of word vectors and the sequence of sentences; executing by a computer processor a conditional random field algorithm to label sentences in the electronic document as either being relevant to the concept being searched for ("State A") or as background information ("State B") based on the stream of features; executing by the computer processor a search algorithm which returns those sentences labelled as State A. The features of the text may include the text of complete sentences, tokens used by the text in each sentence, the sequence of sentences, layout of text and typography of text In one aspect of the invention, the conditional random field algorithm generates a probability of a sentence being relevant to State A; wherein the probability includes a tolerance for words or portions of words which cannot be resolved into computer-readable text.

In another aspect of the invention, the words which cannot be resolved into computer-readable text have properties selected from the group consisting of being spelled incorrectly, being of poor optical character recognition quality, and being in a foreign language.

In another aspect of the invention, the conditional random field algorithm is agnostic to the property which cause the words to be unresolvable into computer-readable text.

In another aspect of the invention, the stream of features is generated, at least in part, from n-gram segments of word vectors within each sentence.

In another aspect of the invention, each feature in the stream of features is tagged using natural language processing techniques.

In another aspect of the invention, the stream of features includes grid-based layout information.

In another aspect of the invention, given a document containing multiple sentences $S:=\{s_1, s_2, \ldots, s_m\}$ and the corresponding concept label for each sentence $Concept:=\{concept_1, concept_2, \ldots, concept_m\}$, the conditional random field function defining the probability of the Concept applied to S, Pr(Concept|S), is expressed as:

$$Pr(\text{Concept} \mid S) = \frac{1}{Z_s} \exp\left(\sum_{j=1}^{K \times L} F_j(\text{Concept}, S)\right) \quad (1)$$

$$= \frac{1}{Z_s} \exp\left(\sum_{i=1,k=1}^{m,K} \lambda_k f_k(y_{i-1}, y_i, S) + \sum_{i=1,l=1}^{m,L} \mu_l g_l(y_i, S)\right),$$

where $Z_s$ is a normalization constant. $f_k(y_{i-1}, y_i, S)$ is an arbitrary feature function over the group of sentences in a document and positions i and i−1. $g_l(y_i, S)$ is a feature function of the state at position i and the document S.

The invention also relates to a system for carrying out the method as described above.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 illustrates text used in a simplified example to which the invention is applied.

DETAILED DESCRIPTION OF THE INVENTION

Figure 1:
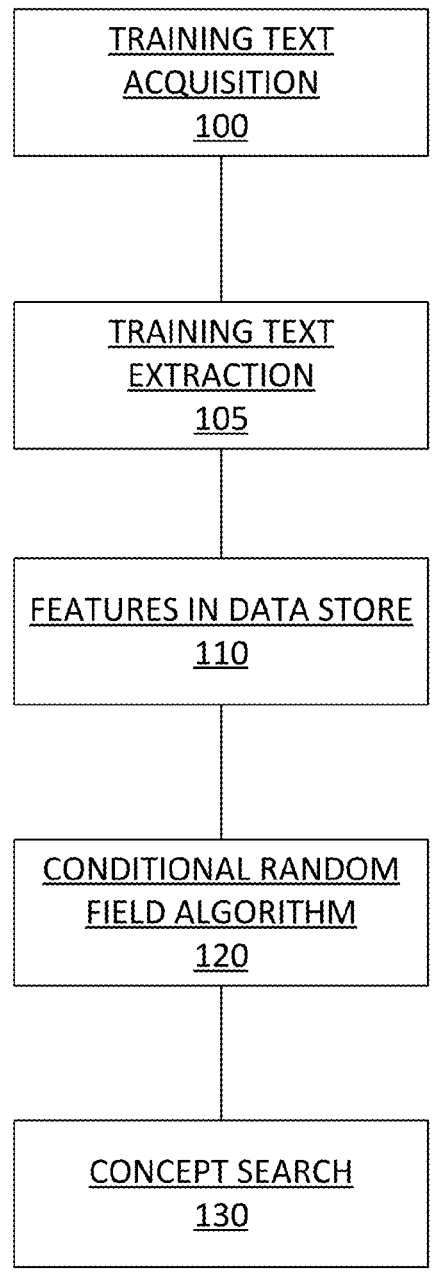
FIG. 1 is a flowchart showing a method according to one embodiment of the invention.

Broadly, the invention as herein described deconstructs training sentences into a stream of features that represent both the sentences and tokens used by the text, their sequence and other ancillary features extracting using natural language processing. Then, a conditional random field is used where the concept being searched for is represented as state A and the background as state B. State B would include all text that is not part of the concept being searched. The model created by this training phase is then used to locate the concept as a sequence of sentences within one or more documents. Compared to the prior art, this approach has advantages in accuracy and speed over methods that individually classify each sentence and then use a secondary method to group the classified sentences into passages. Furthermore, while prior art methods were based on searching for the occurrence of tokens only (such as the search for the specific tokens of header text), the use of a wider set of non-token features enables the method of the invention to locate relevant passages even though a different terminology is in use. This approach effectively turns what is free text for the purpose of prior art keyword searching into a database of characteristics (text or tokens) in which complex searches can be performed.

Reference in this description to text refers to the basic meaning of the term, where text is the plain word or phrase being identified free of its appearance, location or formatting. Tokens are characteristics of text that differentiate certain text from other text within the same document.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. In certain embodiments, the computer may be a digital or any analogue computer.

Program code is applied to input data to perform the functions described herein and to generate output information. The output information is applied to one or more output devices, in known fashion.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., read-only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, nontransitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is only temporarily stored. The computer useable instructions may also be in various forms, including compiled and non-compiled code.

Referring now to FIG. 1, there is shown a method according to one embodiment of the invention in which at step 100, training sentences are imported or otherwise read by a computer system implementing the method. The training sentences may be a subset of a universe of documents which are later to be searched, or more preferably, are a group of known documents of a similar type to the document being searched. In general, the training sentence could be any relevant text accessible by the computer system which can be mined such that the text, tokens and features of the training text becomes a data store of text, tokens and features in step 105 from the perspective of the computer system implementing the invention.

Figure 2:
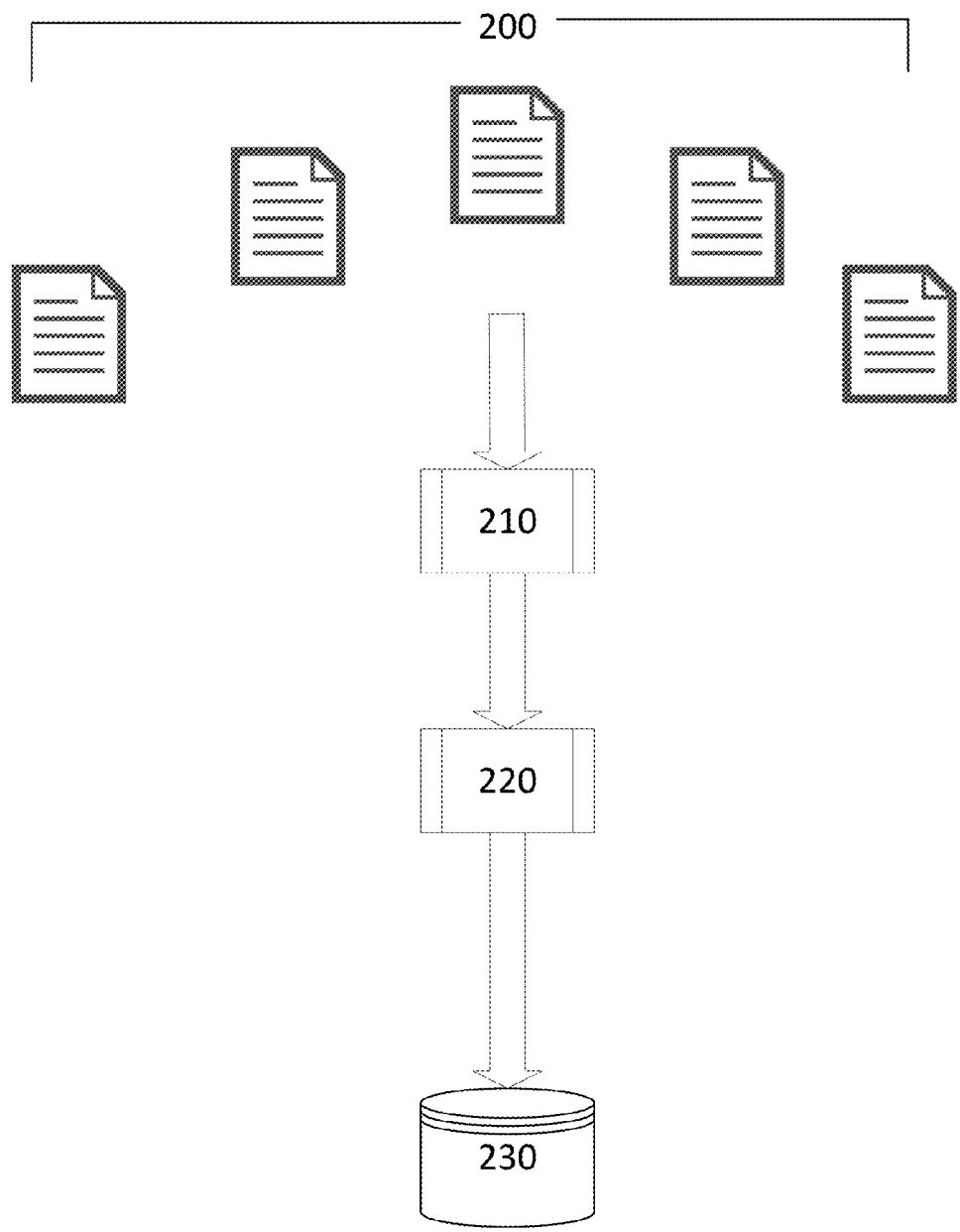
FIG. 2 is a schematic diagram illustrating the generalized processing of training text.

These features of the training text are preferably extracted using natural language processing. Natural language processing algorithms and techniques are generally known in the art, but one way in which this could be implemented is show in FIG. 2, where a plurality of documents to be used as training sentences 200 is shown for the purposes of generating a data store. The training sentences 200 may be any type of electronic document and in generally any computer accessible format such as PDF, text files or HTML, text. Each of the training sentences 200 may have different formatting applied to the text therein. A preprocessing module 210 receives the various training text documents 200 and uses known rules of their formatting to identify text within the document. For example, the preprocessing module 210 would associate text under particular headings as relating to the topic of the heading itself. Other ways of identifying categories of sections of text could also be used. For example, in legal contracts text following the word "whereas" could be used as an indicator of the following text being a recital. The rules with which the preprocessing module 210 operates could be user-updated periodically or for specific applications; or alternatively, the preprocessing module 210 could make use of machine learning techniques to update its rules for classifying text, tokens or features. More broadly, text with certain tokens or formatting conditions may be characterized as header text, text from external sources (for example by being footnoted or endnoted), for example. Once the text has been classified by the preprocessing module, a data store processing module 220 processes the classified text into a formal for storing in the data store 230. The processing of the classified text could be by individual word, complete sentence, text format, or other token of the text. Preferably, however, sentences themselves are extracted and characterized to be stored as a feature in the data store. The final result is a stream of features that represent both the sentences and tokens used by the training text, their sequence and other ancillary features extractable by natural language processing techniques and stored in the data store 230 in step 110 (of FIG. 1). The stream of features may also include layout information that is grid-based, which allows for the recognition of form-based data, or data presented in tabular format which cannot readily be resolved into paragraphs. This also allows for the retrieval of tabular information without the knowledge of what type of form is being used.

In step 120 of FIG. 1, a conditional random field is used to represent the concept being searched for as State A and the background as State B. The concept being searched for might be a topic, heading or general subject matter for which sentences or sequences of sentences within a document are to be searched. The background is all other information in the document. Probabilities are attached to teach sentence in generating the model.

While conditional random fields (CRF) are known in the art, and have been used for the purposes of classifying and labeling words or features in text, the present invention differs from the prior art in that complete sentences or sentence fragments expressing a coherent idea are labelled in accordance with conditional random field principles. In addition, tokens of the text or sentences as a whole are labelled as well. A CRF estimation is generated for each sentence as its likelihood to belong to the concept being searched for.

The CRF algorithm may be implemented in any number of ways, but one specific example will now be defined. The input of the algorithm includes specific concepts Concept:= {concept$_1$, concept$_2$, ..., concept$_m$} and a corresponding set of documents D:={d$_1$, d$_2$, ..., d$_m$} where m is the number of documents. In addition, each document contains a number of sentences S$_i$:={s$^i_1$, s$^i_2$, ..., s$^i_{ni}$} where ni is the number of sentences in document d$_i$. The CRF algorithm of the invention will output to the data store a label for each sentence with a format such as for the jth sentence in the ith document, s$^i_j$, a concept value of c$^i_j$∈{A, B} where, A represents a positive concept match, B represents a negative match (ie. the sentence is considered background).

The utility of the algorithm or model is to give a label to each sentence corresponding to whether or not the sentence fits within the category of concepts being searched for.

CRFs generally provide a probabilistic framework for calculating the probability of Y globally conditioned on X, where X is a random variable over sequence data to be labeled, and Y is a random variable over corresponding label sequences. There are various types of CRF models which could be applied, one example of which is illustrated here.

Applying the general CRF framework to the CRF algorithm parameters described above, and given a document containing multiple sentences S:={s$_1$, s$_2$, ..., s$_m$} and the corresponding concept label for each sentence Concept:= {concept$_1$, concept$_2$, ..., concept$_m$}, the probability of the Concept applied to S, Pr(Concept|S), can be expressed as follows:

$$Pr(\text{Concept} | S) = \frac{1}{Z_s} \exp\left(\sum_{j=1}^{K \times L} F_j(\text{Concept}, S)\right) \quad (1)$$

$$= \frac{1}{Z_s} \exp\left(\sum_{i=1,k=1}^{m,K} \lambda_k f_k(y_{i-1}, y_i, S) + \sum_{i=1,l=1}^{m,L} \mu_l g_l(y_i, S)\right),$$

Where $Z_s$ is a normalization constant. $f_k(y_{i-1}, y_i, S)$ is an arbitrary feature function over the group of sentences in a document and positions i and i-1. $g_l(y_i, S)$ is a feature function of the state at position i and the document S. These feature functions can describe any aspect of the global characteristics of the sentences, S.

For example, the model could be used to evaluate the feature functions such that $f$ to 1 when $y_{i-1}$ has a label A; 1 when $y_i$ has a label B; 1 when $x_{i-1}$ contains a token of the text indicative of the text belonging to the concept being searched for; 1 when $x_i$ contains a different feature of the text indicative of the concept being searched for; and 0 everywhere else. In addition, g could be evaluated to 1 when $y_i$ has the label A; 1 when $x_i$ contains words indicative of the concept being searched for and no negation words; and 0 elsewhere.

$\lambda_k$ and $\mu_l$ are positive weights learned from training data for feature functions $f_k$ and $g_l$, reflecting the model's confidence of the corresponding $f_k$ and $g_l$.

The set of weights and parameters in equation 1 is determined via a parameter estimation process learned from the set of training documents. Parameter estimation is generally known in CRF theory and not described in further detail herein.

Based on the conditional probability of the state defined in Equation 1, a label is applied to each sentence as being either part of State A or State B, where State A identifies the sentence as forming part of the concept being searched for and State B relegates the sentence to background information. All sentences in the document being searched are labelled in this way.

Various features and text of the sentence (as derived from natural language processing (NLP) extraction of individual words and tokens of the text) may be used as inputs to the CRF model to arrive at the label.

Finally, at step 130, a concept search can be performed which would return those sentences, portions of text or other features labelled as forming part of State A.

As an example, and referring now to FIG. 3, consider the five sentences S1-S5 shown in this figure. In this example, the concept being searched for is identified as "Intellectual Property". Using natural language processing, the sentences are processed and individual words, tokens and features tagged. In addition, a set of rules is defined derived from a learning set of documents.

Following the application of the CRF algorithm, S1 is labelled as forming part of State A since it includes the heading in bold font "Patents" which is a feature of the text defined as being associated with Intellectual Property. S2 is also labelled as forming part of State A as the extracted word "trademarks" is a concept associated with intellectual property per the predefined rule. S3 is labelled as State B as no concept associated with intellectual property is found therein. S4 is labelled as State A as a token of the text resulting in a number formatted as xx/xxx,xxx is known to be the format of a patent application number, and thus forms part of the concept associated with intellectual property. S5 may be incorrectly labelled as State A for having the words "intellectual" and "property" within the same sentence, but it is also conceivable that the training set of documents can arrive at the rule that where the term "intellectual" or "property" forms part of a proper name (ie. the company name), then it does not get processed as forming part of the noun "intellectual property" and accordingly S5 would correctly be labelled as State B.

Following the sentence labelling, a search of the concept "intellectual property" within a document containing sentences S1-S5 would show the summary under "Results".

Figure 4:
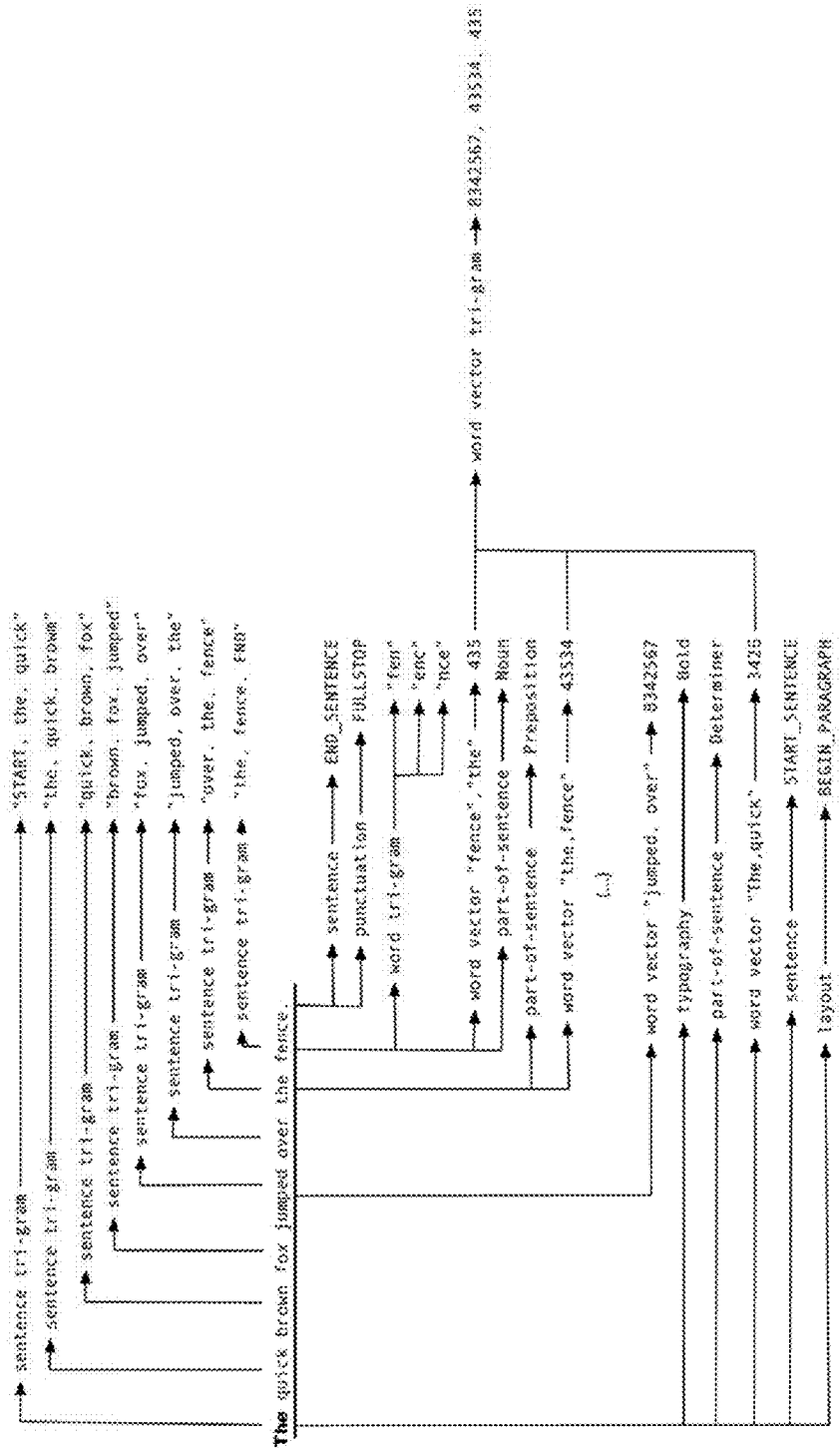
FIG. 4 illustrates text used in an example to which the invention is applied.

A more detailed example of the comprehensive capabilities of the invention is shown in FIG. 4, where the sentence, "The quick brown fox jumped over the fence." is used in an illustrative manner to show how sentences within a document are analyzed. First, the sentence is parsed into n-gram segments of word vectors, in this specific example tri-grams are used. The result may be stored as a matrix of context-specific word vectors representing each of the tri-grams that may track a specific concept relevant to a user's search query. The tri-gram may include features of the sentence, such as sentence start/stop, rather than relying solely on the words themselves.

In addition, beyond the previous example, numerous features that are not token based may be used. As illustrated in FIG. 4, features such as typography and layout are also considered, which permit implementations of the invention to locate desired information even in cases where text is of poor visual quality (ie. cannot readily be converted to searchable text) or may be in foreign languages. Individual words may also be parsed into n-gram segments by syllable to extract information which is not readily computer readable. In FIG. 4, the word "fence" is parsed into the word tri-gram of "fen", "enc", "nce". If a portion of this word, was missing or could not be read due to poor quality, a probabilistic approach of what the word could be may be applied, particularly in context of the part-of-speech and location in the sentence as to what the word could be.

As demonstrated the invention permits the searching of documents to identify sentences and passages relating to a concept. The method is extremely robust in that it can accurately return search results that do not include the specific word or words used to express the concept. Furthermore, based on the learning developed through the training set of documents and labelling of sentences, subsequent searching makes use of computing resources in a more effective manner than the prior art.

The prior art makes use of "stop word" lists that define words that should not be used as they have no semantic value within a certain context. This is problematic in that this list must be created for each search context and some information may be inadvertently lost when the list is not created properly. The method of the present invention does not prune "stop words" from the input text but rather processes them as any other word resulting in better sensitivity to different contexts. Furthermore, this enables the ability to deal with entities such as the music group "The XX" which are normally ignored by systems making use of stop-words. As the method targets sentence level retrieval, word and word vector frequency information is removed from the analysis since its use within a passage of the length of a sentence has no value. Finally, while the prior art makes use of "word vector" features that match semantically related words within a domain, the method of the invention improves upon this by creating features from the n-gram segments of word vectors. This further tracks the specific context required by the user by linking a series of context-specific word vectors in a sequence relevant to the user's query. Within each example sentence or query sentence provided by the user, the generation of features is pruned so that features occur only once within each example feature set. This serves to boost accuracy in that the conditional random fields algorithm used to retrieve the relevant sentence is not overwhelmed with duplicate features.

It will be apparent to one of skill in the art that other configurations, hardware etc. may be used in any of the foregoing embodiments of the products, methods, and systems of this invention. It will be understood that the specification is illustrative of the present invention and that other embodiments within the spirit and scope of the invention will suggest themselves to those skilled in the art.

The aforementioned embodiments have been described by way of example only. The invention is not to be considered limiting by these examples and is defined by the claims that now follow.

What is claimed is:

1. A method for searching an electronic document for passages relating to a concept being searched for, where the concept is expressed as a word or plurality of words, the method comprising:

deconstructing by a computer processor training electronic texts stored on a computer readable into a stream of features;

storing the stream of features in a data store; wherein the features include the text of complete sentences, tokens used by the text in each sentence, the sequence of sentences, layout of text and typography of text;

executing by a computer processor a conditional random field algorithm to label sentences in the electronic document as either being relevant to the concept being searched for ("State A") or as background information ("State B") based on the stream of features;

executing by the computer processor a search algorithm which returns those sentences labelled as State A;

wherein the conditional random field algorithm generates a probability of a sentence being relevant to State A; wherein the probability includes a tolerance for words or portions of words which cannot be resolved into computer-readable text;

wherein, given a document containing multiple sentences $S:=\{s_1, s_2, \ldots, s_m\}$ and the corresponding concept label for each sentence Concept:=$\{concept_1, concept_2, \ldots, concept_m\}$, the conditional random field function defining the probability of the Concept applied to S, Pr(Concept|S), is expressed as:

$$Pr(\text{Concept} \mid S) = \frac{1}{Z_s} \exp\left(\sum_{j=1}^{K \times L} F_j(\text{Concept}, S)\right)$$

$$= \frac{1}{Z_s} \exp\left(\sum_{i=1,k=1}^{m,K} \lambda_k f_k(y_{i-1}, y_i, S) + \sum_{i=1,l=1}^{m,L} \mu_l g_l(y_i, S)\right)$$

where $Z_s$ is a normalization constant, $f_k(y_{i-1}, y_i, S)$ is an arbitrary feature function over the group of sentences in a document and positions i and i−1, $g_l(y_i, S)$ is a feature function of the state at position i and the document S.

2. The method according to claim 1, wherein said words which cannot be resolved into computer-readable text have properties selected from the group consisting of being spelled incorrectly, being of poor optical character recognition quality, and being in a foreign language.

3. The method according to claim 2, wherein the conditional random field algorithm is agnostic to the property which cause said words to be unresolvable into computer-readable text.

4. The method according to claim 1, wherein the stream of features are generated, at least in part, from n-gram segments of word vectors within each sentence.

5. The method according to claim 1, wherein each feature in the stream of features is tagged using natural language processing techniques.

6. The method according to claim 1, wherein the stream of features includes grid-based layout information.

7. A system for searching an electronic document for passages relating to a concept being searched for, where the concept is expressed as a word or plurality of words, the system comprising:

a computer processor deconstructing training electronic texts stored on a computer readable into a stream of features;

a data store storing the stream of features; wherein the features include the text of complete sentences, tokens used by the text in each sentence, the sequence of sentences, layout of text and typography of text;

wherein the computer processor executes a conditional random field algorithm to label sentences in the electronic document as either being relevant to the concept being searched for ("State A") or as background information ("State B") based on the stream of features;

and wherein the computer processor executes a search algorithm which returns those sentences labelled as State A;

wherein the conditional random field algorithm generates a probability of a sentence being relevant to State A; wherein the probability includes a tolerance for words or portions of words which cannot be resolved into computer-readable text;

wherein, given a document containing multiple sentences $S:=\{s_1, s_2, \ldots, s_m\}$ and the corresponding concept label for each sentence Concept:=$\{concept_1, concept_2, \ldots, concept_m\}$, the conditional random field function defining the probability of the Concept applied to S, Pr(Concept|S), is expressed as:

$$Pr(\text{Concept} | S) = \frac{1}{Z_s} \exp\left(\sum_{j=1}^{K \times L} F_j(\text{Concept}, S)\right)$$

-continued $$= \frac{1}{Z_s} \exp\left(\sum_{i=1,k=1}^{m,K} \lambda_k f_k(y_{i-1}, y_i, S) + \sum_{i=1,l=1}^{m,L} \mu_l g_l(y_i, S)\right)$$

where $Z_s$ is a normalization constant, $f_k(y_{i-1}, y_i, S)$ is an arbitrary feature function over the group of sentences in a document and positions i and i−1, $g_l(y_i, S)$ is a feature function of the state at position i and the document S.

8. The system according to claim 7, wherein said words which cannot be resolved into computer-readable text have properties selected from the group consisting of being spelled incorrectly, being of poor optical character recognition quality, and being in a foreign language.

9. The system according to claim 8, wherein the conditional random field algorithm is agnostic to the property which cause said words to be unresolvable into computer-readable text.

10. The system according to claim 7, wherein the stream of features are generated, at least in part, from n-gram segments of word vectors within each sentence.

11. The system according to claim 7, wherein each feature in the stream of features is tagged using natural language processing techniques.

12. The system according to claim 7, wherein the stream of features includes grid-based layout information.

* * * * *